United States Patent

Lumbard

[11] Patent Number: 5,855,924
[45] Date of Patent: *Jan. 5, 1999

[54] CLOSED-MOLD FOR LED ALPHANUMERIC DISPLAYS

[75] Inventor: Marvin Lumbard, Los Gatos, Calif.

[73] Assignee: Siemens Microelectronics, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 579,535

[22] Filed: Dec. 27, 1995

[51] Int. Cl.⁶ ..................................................... B29C 39/28
[52] U.S. Cl. ...................... 425/116; 425/121; 264/272.14; 264/272.17
[58] Field of Search ..................................... 425/121, 116, 425/544, DIG. 228, 567, 574, 117; 264/272.17, 272.14; 29/588

[56] References Cited

U.S. PATENT DOCUMENTS

| | | | |
|---|---|---|---|
| 3,899,305 | 8/1975 | Hilgers et al. | |
| 4,084,312 | 4/1978 | Kirk et al. | 29/588 |
| 4,480,975 | 11/1984 | Plummer et al. | 425/116 |
| 4,615,857 | 10/1986 | Baird | 425/116 |
| 4,626,185 | 12/1986 | Monnet | 425/116 |
| 4,653,993 | 3/1987 | Boschman | 425/116 |
| 4,655,274 | 4/1987 | Dannoura | 425/544 |
| 4,881,885 | 11/1989 | Kovac et al. | 425/121 |
| 4,895,503 | 1/1990 | Proska et al. | 425/544 |
| 4,948,359 | 8/1990 | Yasui | 425/576 |
| 5,059,105 | 10/1991 | Baird | 425/121 |
| 5,302,101 | 4/1994 | Nishimura | 425/121 |
| 5,391,346 | 2/1995 | Nakamura et al. | 264/272.14 |

FOREIGN PATENT DOCUMENTS

| | | |
|---|---|---|
| 0 070 320 | 1/1983 | European Pat. Off. . |
| 1 100 574 | 2/1984 | European Pat. Off. . |
| 83 07437 | 11/1984 | France . |
| 1232006 | 9/1989 | Japan . |
| 2 104 827 | 3/1983 | United Kingdom . |
| 2 252 746 | 8/1992 | United Kingdom . |

*Primary Examiner*—Jay H. Woo
*Assistant Examiner*—Minh-Chau T. Pham

[57] ABSTRACT

A closed mold for encapsulating LED alphanumeric display devices uses opposing platens and top and bottom plates to achieve a seal about the display device. By providing the display device with a dambar, splatter on the leads is avoided.

5 Claims, 5 Drawing Sheets

FIFG. 5

CLOSED-MOLD FOR LED ALPHANUMERIC DISPLAYS

FIELD OF THE INVENTION

This invention generally relates to LED alphanumeric displays. Specifically, the invention is directed to a scheme for packaging an LED alphanumeric display.

BACKGROUND OF THE INVENTION

For certain applications, a surface-mount or a gull-wing type lead configuration is preferred for an LED alphanumeric display package. The foundation for a display with this kind of lead configuration is an axial-cast printed circuit board encapsulated in epoxy in a vacuum mold. However, in producing such a device, one may encounter gas bubbles and pockets that form in the epoxy as the epoxy enters the cavity of the mold. Bubbles or pockets in the epoxy can affect the appearance and performance of a display. Another difficulty that may occur is splatter of epoxy on the leads, which could interfere with the electrical and mechanical integrity of the leads. If epoxy does get on the leads, a time-consuming and costly cleaning step is required.

It would be desirable to provide a means and a method of encapsulating the display to avoid the difficulties noted above.

SUMMARY OF THE INVENTION

The present invention obviates the aforementioned problems by providing a closed mold of opposing platens for encapsulating an electrical device, such as, an LED alphanumeric display. The device to be encapsulated is set in an axial-leaded leadframe that has a peripheral dambar to prevent epoxy from getting on the leads. Improved flow of epoxy in the cavities of the mold is provided by funnels formed by the opposing platens of the closed mold.

BRIEF DESCRIPTION OF THE DRAWINGS

For a better understanding of the invention, reference is made to the following description of an exemplary embodiment thereof, and to the accompanying drawings, wherein:

FIG. 5 is a perspective view of an encapsulated LED alphanumeric display with leads configured for through-board insertion.

DETAILED DESCRIPTION

Figure 1:
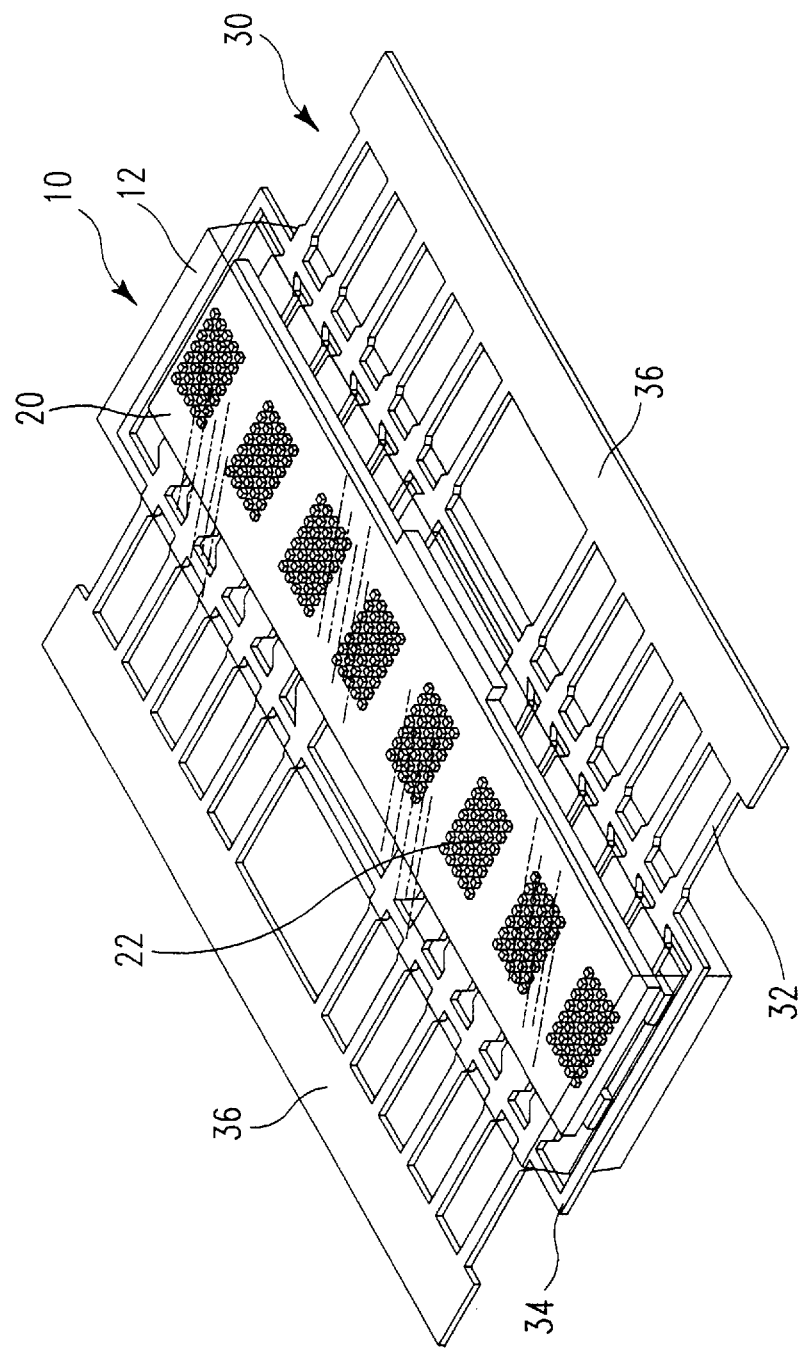
FIG. 1 is a perspective view of an LED alphanumeric display employing an axial-leaded leadframe.

FIG. 1 shows an LED alphanumeric display assembly 10 encapsulated in epoxy 12 before trimming of the leadframe. In this illustration, the display assembly 10 has a printed circuit board 20 generally rectangular in shape and containing display elements 22 and an axial-leaded leadframe 30. The leadframe has multiple leads 32, a peripheral dambar 34, and temporary support members 36. The dambar 34 encompasses the circuit board 20 and is removed along with the temporary support members 36.

Figure 2:
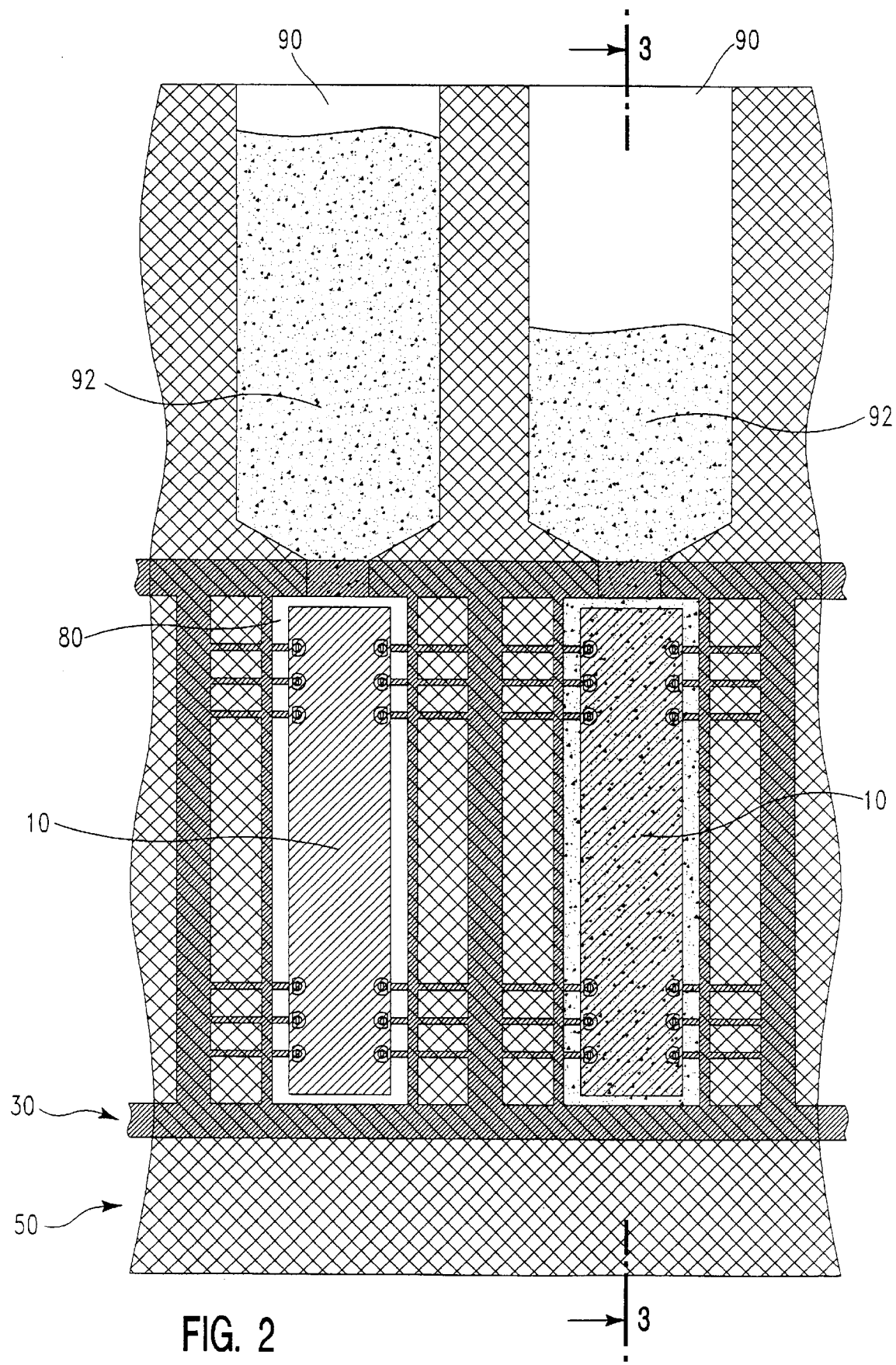
FIG. 2 is a partial cross-sectional view of a closed mold of the present invention.
Figure 3:
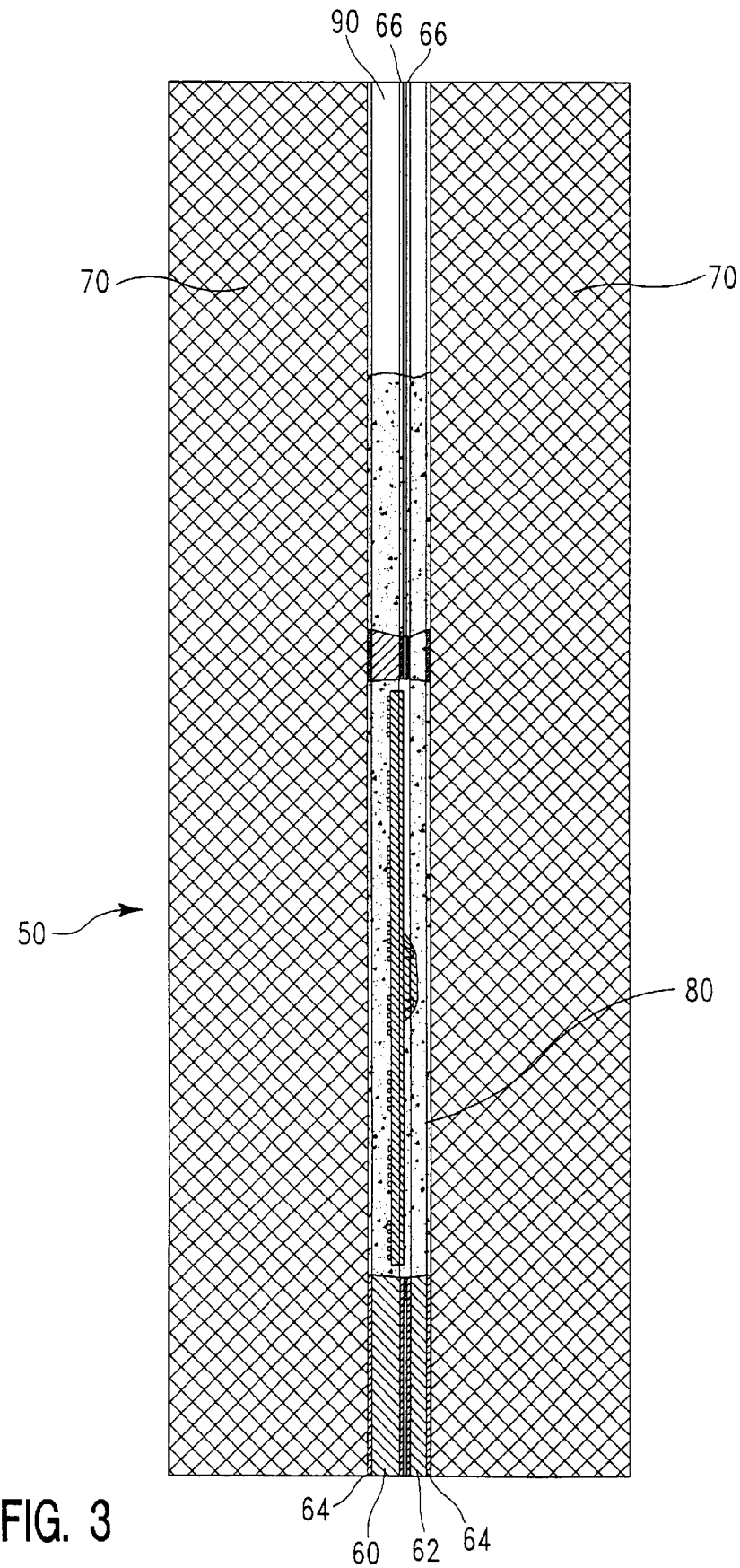
FIG. 3 is a cross-sectional end-view of the closed mold of FIG. 2 taken along lines A—A.
Figure 4:
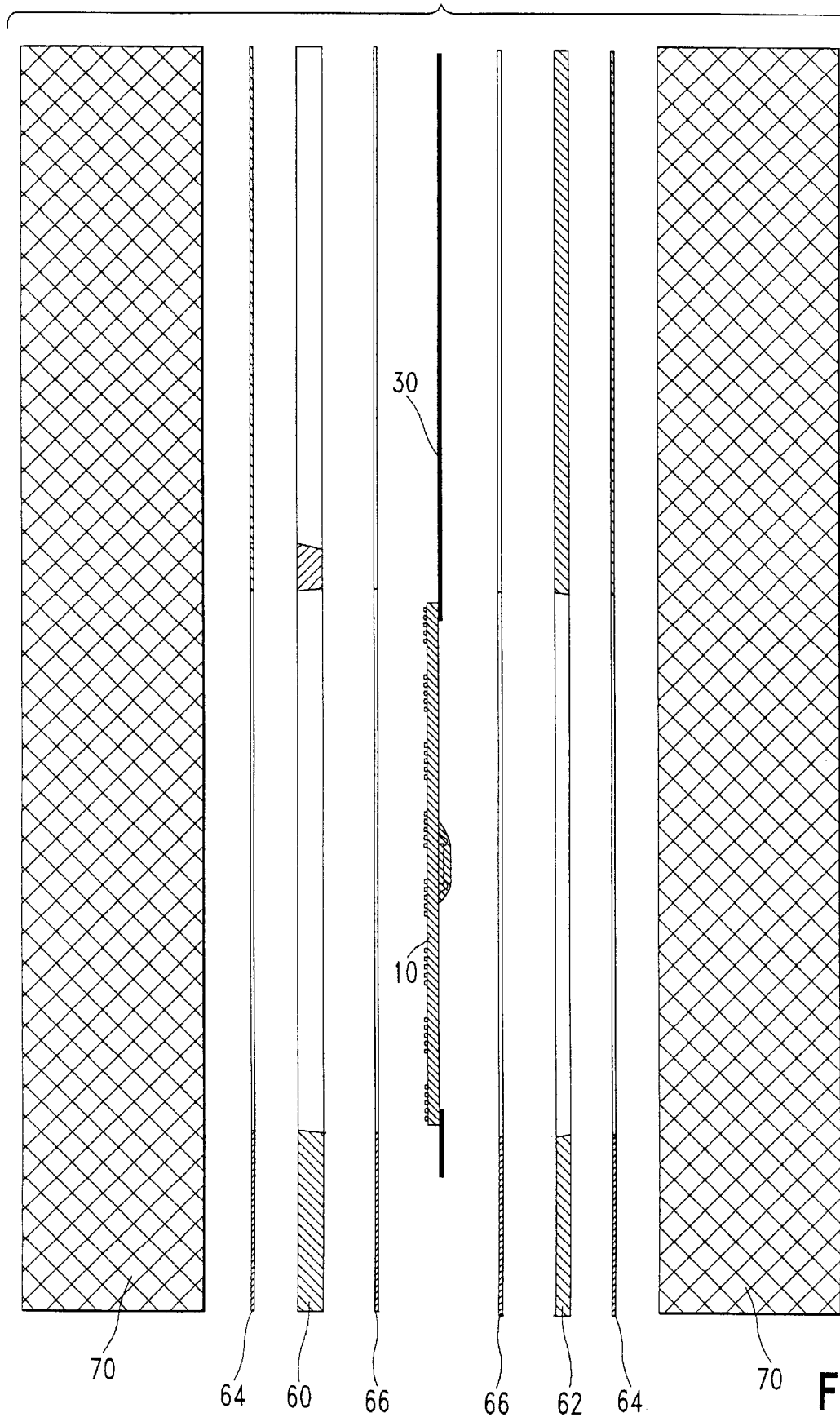
FIG. 4 is an exploded cross-sectional view of the closed mold of FIG. 3.

For encapsulation in epoxy, the display assembly 10 is encapsulated in a closed mold 50 as illustrated in FIGS. 2–4. In FIG. 2, two display assemblies 10 are shown suspended in a leadframe 30. The leadframe 30 is held between two plates, a top mold plate 60 and a bottom mold plate 62, as illustrated in FIG. 3, located on opposing flat polished platens 70.

The top and bottom mold plates 60 and 62 define mold cavities 80, which are selected here to be slightly larger than the dimensions of the printed circuit board 20 and ultimately determine the dimensions of the encapsulated devices. To improve the sealing of the mold as well as decrease the pressure needed to create a seal, one may provide 0.010 inch-thick silicone gaskets 64 between the plates 60 and 62 and the platens 70. Additionally, gaskets 66 can be provided on each of the opposing surfaces of the plates 60 and 62, as shown in FIGS. 3 and 4.

The platens 70 also form epoxy supply funnels 90 spaced apart so that they coincide with each mold cavity 80. In a preferred embodiment, the cross-sectional area of the entrance aperture is greater than the cross-sectional area of the exit aperture and the cross-sectional area is monotonically non-increasing from the entrance aperture to the exit aperture. Epoxy is then poured into the funnels 90. Alternatively, the funnels 90 can be wholly contained located within one or the other of the opposing plattens 70.

To encapsulate a display assembly 10, the assembly 10 is placed between the top and bottom mold plates 60 and 62, and the mold 50 is closed and sealed. Minimal pressure is required to maintain the seal. The mold 50 is then placed in a vacuum chamber and a vacuum of, e.g., 1 torr is pulled.

Pre-degassed epoxy 92 is then rapidly dispensed into the individual funnels 90, in a relatively steady flow to avoid sheeting or bubbling. The amount of epoxy required for encapsulation is approximately one-and-one-half the volume of the display printed circuit board 20. The vacuum is then cracked, forcing the epoxy into the evacuated mold cavities 80, intentionally leaving excess epoxy 92 in the funnels 90 after the mold cavities are filled. The epoxy is then cured, the overfill is removed, the dambar 34 is trimmed and the leads 32 are formed, completing the display device.

Figure 6:
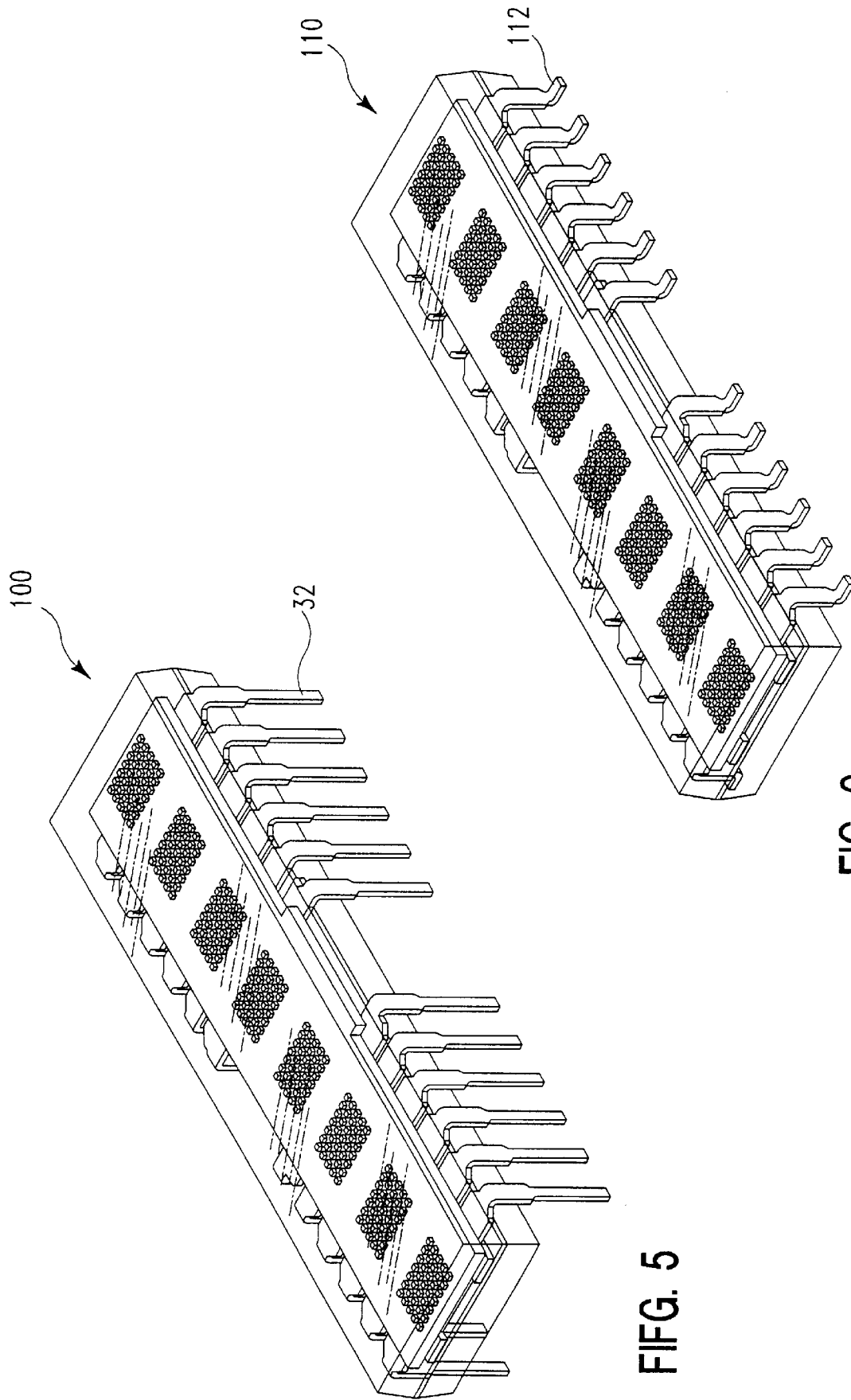
FIG. 6 is a perspective view of an encapsulated LED alphanumeric display with gull-wing type leads configured for surface mounting.

A display assembly 100 have leads 32 trimmed and configured for a through-board application is shown in FIG. 5. A display assembly 110 with a gull-wing lead configuration 112 is illustrated in FIG. 6.

The embodiments described herein are merely illustrative of the principles of the present invention. Various modifications may be made thereto by persons ordinarily skilled in the art, without departing from the scope or spirit of the invention.

What is claimed is:

1. A closed mold for encapsulating a device with epoxy, comprising:

two opposing platens, and a top mold plate and a bottom mold plate, each of the mold plates being affixed to one of the opposing platens, the opposing platens and the mold plates together defining at least one mold cavity and at least one epoxy supply funnel for the introduction of epoxy into the mold cavity using a vacuum-mold process, the supply funnel having an entrance aperture and an exit aperture wherein the cross-sectional area of the entrance aperture is greater than the cross-sectional area of the exit aperture and the cross-sectional area is monotonically non-increasing from the entrance aperture to the exit aperture, wherein the mold cavity is connected to the exit aperture of said supply funnel.

2. The apparatus as set forth in claim 1, further comprising a gasket positioned between each of the mold plates and the platens.

3. The apparatus as set forth in claim 2, wherein the gasket is silicone.

4. The apparatus as set forth in claim 1, wherein the device to be encapsulated has a peripheral dambar, said top and bottom mold plates and said dambar in combination comprising a seal for the mold cavity.

5. A closed mold for encapsulating a device with epoxy, comprising:

two opposing platens, and a top mold plate and a bottom mold plate, each of the mold plates being affixed to one of the opposing platens, the opposing platens and the mold plates together defining at least one epoxy supply funnel for the introduction of epoxy into a mold cavity using a vacuum-mold process, wherein the mold cavity is connected to the exit aperture of said supply funnel, and wherein the device to be encapsulated has a peripheral dambar, said top and bottom mold plates and said dambar in combination comprising a seal for the mold cavity.

\* \* \* \* \*